United States Patent Office 3,232,930
Patented Feb. 1, 1966

3,232,930
16β-(OPTIONALLY SUBSTITUTED)-AMINOPREGN-5-ENE-3β,17α,20-TRIOLS, 21-OXYGENATED, 6-METHYL, 5,6-DIHYDRO, AND 9(11)-DEHYDRO COMPOUNDS CORRESPONDING AND DERIVATIVES THEREOF
Clarence G. Bergstrom, Chicago, Ill., assignor to G. D. Searle & Co., Chicago, Ill., a corporation of Delaware
No Drawing. Filed May 19, 1964, Ser. No. 368,688
20 Claims. (Cl. 260—239.5)

This invention relates to 16β-(optionally substituted) amino-steroids and, more particularly, to the 16β-(optionally substituted)aminopregn-5-ene-3β,17α,20-triols, 21-oxygenated, 6-methyl, 5,6-dihydro, and 9(11)-dehydro compounds corresponding, and the related derivatives represented by the following structural formula

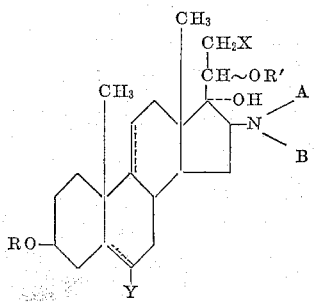

and also the 17,20-acetonides thereof, wherein R and R' can be either hydrogen or a lower alkanoyl radical, X is a member of the group consisting of hydrogen, hydroxy, and (lower alkanoyl)oxy, A can be hydrogen or a lower alkyl, hydroxy(lower alkyl) or amino(lower alkyl) radical, B is selected from the class consisting of hydrogen, lower alkyl, and lower alkanoyl radicals, and, alternatively, A and B together with the nitrogen atom comprise a morpholino, N-methylpiperazino, or

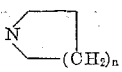

radical, wherein $n$ is a positive integer less than 4, Y can be either hydrogen or the methyl radical, the dotted lines indicate that the 5,6 and 9(11) linkages are optionally doubly bonded, and the wavy line demonstrates that both the 20α and 20β epimers are encompassed by the invention.

Illustrative of the lower alkanoyl radicals encompassed in that structural representation are acetyl, propionyl, butyryl, valeryl, caproyl, and the branched-chain groups isomeric therewith. By the term lower alkyl there is contemplated the hydrocarbon radicals exemplified by methyl, ethyl, propyl, butyl, pentyl, hexyl, and the corresponding branched-chain isomers.

Starting materials suitable for the manufacture of the instant novel compounds are the 16α,17α-epoxides of the following structural formula

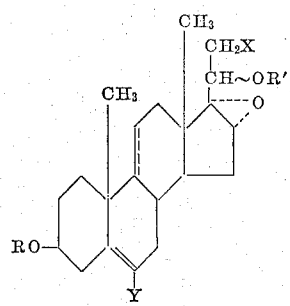

wherein R, R', X, Y, the dotted lines, and the wavy line have the identical meanings designated hereinbefore. Those starting materials in turn are obtained by reduction of the corresponding 3-hydroxy-Δ⁵ and 3-keto-Δ⁴ 20-keto substances. Specific examples of the latter compounds are 16α,17α-epoxy-3β-hydroxy-6-methylpregn-5-en-20-one (J. Chem. Soc., 1959, 478–9), 21-acetoxy-16α,17α-epoxy-3β-hydroxypregn-5-en-20-one (J. Am. Chem. Soc., 72, 5145 (1950)) and 16α,17α-epoxypregn-4,9(11)-diene-3,20-dione (J. Am. Chem. Soc., 81, 4432 (1959)). In addition, 16α,17α-epoxypregn-5-ene-3β,20β-diol is described at Gazz. Chim. Ital., 86, 1219 (1956). Reaction of a precursor of that formula with ammonia or an organic amine in the presence of an acidic catalyst affords the corresponding 16β-(optionally substituted)amino-17α-hydroxy compound. In the case of ammonia or a low molecular weight amine such as methylamine, the reaction is conducted under pressure, while the process involving higher boiling amines can be conducted at atmospheric pressure and at the reflux temperature of the reaction mixture. The reaction temperature varies from 100–200° C. These processes are specifically illustrated by the reaction of 16α,17α-epoxypregn-5-ene-3β,20β-diol 3,20-diacetate with methylamine in the present of p-toluenesulfonic acid at 130° under 700 pounds per square inch pressure to yield 16β-methylaminopregn-5-ene-3β,17α,20β-triol and the reaction of that same 16,17-epoxide with N-methylpiperazine in the presence of p-toluenesulfonic acid at atmospheric pressure and at the reflux temperature to afford 16β-N-methylpiperazinopregn-5-ene-3β,17α,20β-triol.

The instant N-(lower alkanoyl) derivatives are obtained by acylation of the corresponding 16β-amino compounds, typically by reaction with a lower alkanoic acid anhydride in the presence of a suitable acid acceptor. For example, the aforementioned 16β-methylaminopregn-5-en-3β,17α,20β-triol is allowed to react with acetic anhydride and pyridine at room temperature, resulting in 16β-(N-acetyl-N-methyl)aminopregn-5-ene-3β,17α,20β-triol 3,20-diacetate.

An alternate method for manufacture of the 16β-dialkylamino derivatives of this invention consists of reacting the corresponding 16β-alkylamino compound with a suitable alkylating agent. A typical process is illustrated by the alkylation of 16β-methylaminopregn-5-ene-3β,17α,20β-triol with methyl iodide in the presence of sodium bicarbonate, thus affording 16β-dimethylaminopregn-5-ene-3β,17α,20β-triol. Alkylation with methyl iodide in nitrobenzene at the reflux temperature affords the corresponding quaternary salt, i.e., 16β-trimethylammoniumpregn-5-ene-3β,17α,20β-triol iodide. Reduction of the instant N-acyl derivatives provides an additional method for manufacture of the instant N-alkylated compounds. 16β-(N-acetyl-N-methyl)aminopregn-5-ene-3β,17α,20β-triol 3,20-diacetate, for example, is heated in tetrahydrofuran with lithium aluminum hydride to afford 16β - (N - ethyl - N-methyl)aminopregn-5-ene-3β, 17α,20β-triol.

The instant derivatives possessing the 5α-pregnane ring structure are readily produced by catalytic hydrogenation of the corresponding Δ⁵ compounds. Thus, 16β-methylaminopregn-5-ene-3β,17α,20β-triol in ethanol containing hydrogen chloride is shaken with platinum oxide catalyst and hydrogen gas to yield 16β-methylamino-5α-pregnane-3β,17α,20β-triol.

The 17,20-acetonides of the present invention are produced by reaction of the corresponding 17,20-dihydroxy compound with acetone in the presence of an acidic catalyst. As a specific illustration, 16β-methylaminopregn-5-ene-3β,17α,20β-triol is allowed to react with acetone in the presence of perchloric acid to afford 16β-methylaminopregn-5-ene-3β,17α,20β-triol 17,20-acetonide.

Equivalent to the instant amines for the purposes of this invention are the corresponding non-toxic acid and quaternary salts as exemplified by the citrate, tartrate, maleate, ascorbate, gluconate, lactate, succinate, phosphate, sulfate, hydrobromide, hydrochloride, methiodide, ethiodide, methochloride, methobromide, methosulfate, ethosulfate, etc.

The compounds of the present invention are useful as a result of their valuable pharmacological properties. They possess, for example, anorectic, central nervous system-affective, desoxycorticosterone acetate-inhibitory, hypocholesterolemic, pepsin-inhibitory, hypotensive and anti-inflammatory properties. In addition, they exhibit anti-bacterial, anti-fungal, anti-protozoal and anti-algal activity as is evidenced by their ability to inhibit the growth of such organisms as *Diplococcus pneumoniae, Candida albicans, Tetrahymena gellei,* and *Chlorella vulgaris.* They are able also to inhibit dicotyledonous seed germination.

The invention will appear more fully from the examples which follow. These examples are set forth by way of illustration only, and it will be understood that the invention is not to be construed as limited either in spirit or in scope by the details contained therein, as many modifications in materials and methods will be apparent from this disclosure to those skilled in the art. In these examples, temperatures are given in degrees centigrade (° C.). Quantities of materials are expressed in parts by weight unless otherwise noted.

Example 1

To a stirred suspension of 200 parts of 16α,17α-epoxy-3β-hydroxypregn-5-en-20-one in 2000 parts by volume of ethanol containing 20 parts by volume of 10% aqueous sodium hydroxide is added portionwise 11 parts of sodium borohydride. An exothermic reaction initially ensues, during which time the mixture becomes homogeneous. After stirring for about one hour, during which period of time new crystals appear, the suspension is cooled to 0–5° over a period of about 2 hours, and 21 parts of acetic acid is slowly added. Dilution of that mixture with a large quantity of ice results in the formation of a precipitate which is collected by filtration and dried to afford a mixture of the epimeric 20-hydroxy compounds, melting at about 145–197°.

A mixture of the latter epimeric diols amounting to 360 parts is stirred with 900 parts of pyridine at room temperature for one hour, then at 0–5° for about 3 hours. Filtration of that mixture affords a filter cake consisting predominantly of 16α,17α - epoxypregn - 5 - ene-3β,20α-diol. The filter cake is washed with cold pyridine, and the combined filtrates are mixed with 360 parts of acetic anhydride, then allowed to stand at room tmeperature for about 16 hours. Careful dilution of that acetylation mixture with ice and water affords a precipitate which is collected by filtration and dried. Recrystallization from acetone-hexane affords pure 16α,17α-epoxypregn-5-ene-3β,20β-diol 3,20-diacetate, which displays a double melting point at about 136–137.5° and 147–148°. It is further characterized by an optical rotation in ethanol of 0.00° and infrared absorption maxima at about 5.77 and 7.97 microns.

Crude 16α,17α-epoxypregn-5-ene-3β,20α-diol amounting to 492 parts is mixed with 1200 parts of acetic anhydride and 2400 parts of pyridine, and that reaction mixture is stored at room temperature for about 16 hours. Careful dilution of the mixture with ice and water results in precipitation of the crude product, which is collected by filtration and dried. Recrystallization from acetone yields pure 16α,17α-epoxypregn-5-ene-3β,20α-diol 3,20-diacetate.

Example 2

To a solution of 5 parts of 16α,17α-epoxypregn-5-ene-3β,20α-diol 3,20-diacetate in 280 parts of methanol is added 10 parts by volume of 10% aqueous sodium hydroxide, and the resulting reaction mixture is stored at room temperature for about 16 hours, then is poured carefully into approximately 2000 parts of water. The precipitated crude product is collected by filtration, then is crystallized twice from chloroform to afford pure 16α,17α-epoxypregn-5-ene-3β,20α-diol, melting at about 185–211°. It displays an optical rotation of −42.5° in ethanol and is characterized further by an infrared absorption peak at 2.98 microns (potassium bromide disc).

Example 3

A solution of one part of 16α,17α-epoxypregn-5-ene-3β,20β-diol 3,20-diacetate in 25 parts by volume of a methanolic solution containing 2 parts by volume of 10% aqueous sodium hydroxide is kept at room temperature for about 16 hours, then is diluted carefully with water. The precipitate which results is collected by filtration and recrystallized from acetone-hexane to afford pure 16α, 17α - epoxypregn - 5 - ene - 3β,20β - diol, melting at about 163.5–186.5°. It displays infrared absorption maxima, in chloroform, at about 2.74 and 2.85 microns and also an optical rotation of −59.5° in ethanol.

Example 4

To a stirred solution of 20 parts of 16α,17α-epoxy-3β-hydroxy-6-methylpregn-5-en-20-one in 200 parts by volume of a methanolic solution containing 2 parts by volume of 10% aqueous sodium hydroxide is added 1.1 parts of sodium borohydride, and the resulting reaction mixture is stirred at room temperature for about 2 hours. At the end of that time, 2.1 parts of acetic acid is added, and the resulting mixture is diluted with approximately 800 parts of ice. The precipitated product is collected by filtration and dried to afford a mixture of the 20α and 20β epimers of 16α,17α-epoxy-6-methylpregn-5-ene-3β,20-diol. Fractional crystallization of that mixture from acetone-hexane results in pure 16α,17α-epoxy-6-methylpregn-5-ene-3β,20β-diol, melting at about 183.5–190.5°. It is characterized further by an optical rotation of −63° in chloroform and by infrared absorption maxima at about 2.75 and 2.87 microns in chloroform.

Example 5

A mixture of one part of the epimeric 16α,17α-epoxy-6-methylpregn-5-ene-3β,20-diols with 5 parts of pyridine and 2.5 parts of acetic anhydride is stored at room temperature for about 21 hours, then is added slowly, with stirring, to approximately 50 parts of water, and the white gummy material which separates is converted to a solid by cooling of the mixture. That solid is collected by filtration, then purified by low temperature crystallization from ether-hexane. Recrystallization from hexane yields pure 16α,17α-epoxy-6-methylpregn-5-ene-3β,20β-diol 3,20-diacetate, melting at about 128.5–129.5°, and characterized further by an optical rotation of −16° in ethanol. Infrared absorption maxima are observed at about 5.76 and 7.94 microns in chloroform.

Example 6

To a stirred solution of 6.13 parts of 16α,17α-epoxypregna-4,9(11)-diene-3,20-dione in 240 parts of tertiary-butyl alcohol, under nitrogen, is added 21 parts of potassium tertiary-butoxide. After about 1½ hours at room temperature, the mixture is cooled to 0–5°, and 310 parts by volume of an aqueous solution containing 11.2 parts of acetic acid is added. To that mixture is then added cautiously 3.04 parts of sodium borohydride over a period of about 10 minutes. The reaction mixture is stirred for about one hour, then is diluted successively with about 2500 parts of water and 52.5 parts of acetic acid. The resulting epimeric mixture of 16α,17α-epoxypregna-5,9-(11)-diene-3β,20-diols melts at 105.5–172.5°. Separation of that mixture into the individual pure epimers is effected by chromatography on silica gel. The silica gel column is eluted with 25% ethyl acetate in benzene, and the early fractions are combined and crystallized first from acetone then from acetone-hexane to yield 16α,17α-epoxypregna-5,9(11-diene-3β,20β-diol, melting at about 175.5–186.5°, and characterized also by an infrared absorption maximum, in a potassium bromide disc, at about 2.96 microns and an optical rotation of +11° in ethanol. The later 25% ethyl acetate in benzene fractions are combined and crystallized first from acetone-hexane then from acetone to yield pure 16α,17α-epoxypregna-5,9(11)-diene-3β,20α-diol, which melts at about 225–237°, displays an optical rotation of +2° in ethanol, and is characterized further by an infrared absorption maximum at about 2.93 microns (potassium bromide disc).

*Example 7*

A mixture of 5 parts of 16α,17α-epoxypregna-5,9(11)-diene-3β,20α-diol, 500 parts of pyridine, and 100 parts of acetic anhydride is allowed to stand at room temperature for about 16 hours, then is cooled and carefully diluted with water. The precipitated crude product is collected by filtration, then crystallized twice from acetone-hexane to afford pure 16α,17α-epoxypregna-5,9(11)-diene-3β,20α-diol 3,20-diacetate, which melts at about 194–194.5°, displays an optical rotation of —13° in ethanol, and is characterized further by infrared absorption maxima at about 5.76 and 7.95 microns.

*Example 8*

A mixture of one part of 16α,17α-epoxypregna-5,9(11)-diene-3β,20β-diol, 10 parts of acetic anhydride, and 20 parts of pyridine is kept at room temperature for about 16 hours, then is cooled and diluted by the gradual addition of water. The crude diacetate which precipitates is collected by filtration, then crystallized twice from acetone-hexane to yield pure 16α,17α-epoxypregna-5,9(11)-diene-3β,20β-diol 3,20-diacetate, melting at about 147–148°. It is characterized further by an optical rotation of +22° in ethanol and by infrared absorption maxima, in chloroform, at about 5.77 and 7.94 microns.

*Example 9*

To a stirred solution of 30 parts of 21-acetoxy-16α,17α-epoxy-3β-hydroxypregn-5-en-20-one in 2400 parts of methanol, at 0–5°, is added cautiously 6 parts of sodium borohydride. After stirring for about 4 hours, 31.5 parts of acetic acid is added, and the solvent is removed by distillation at reduced pressure. Partition of the residue between ethyl acetate and water affords an organic layer, which is washed successively with water, saturated aqueous sodium bicarbonate, and water, then dried over anhydrous sodium sulfate and evaporated to dryness at reduced pressure. The residual waxy solid is dissolved in a mixture of 150 parts of pyridine and 75 parts of acetic anhydride, and that solution is kept at room temperature for about 16 hours. Dropwise addition of that acetylation mixture to a well-stirred mixture of ice and water results in formation of a precipitate, which is collected by filtration and dried to afford the crude product melting at 121.5–164.5°. Several recrystallizations from acetone-hexane results in pure 16α,17α-epoxypregn-5-ene-3β,20β,21-triol 3,20,21-triacetate, melting at about 179–181.5°. It displays an optical rotation of +25.5° in ethanol. Infrared absorption maxima are observed, in chloroform, at 5.74 and 7.96 microns.

The latter acetone-hexane mother liquors are allowed to evaporate to dryness slowly to yield a residue containing mixed crystals. The prismatic crystals are removed mechanically and are recrystallized several times from acetone-hexane to yield pure 16α,17α-epoxypregn-5-ene-3β,20α,21-triol 3,20,21-triacetate, melting at about 129.5–131°, exhibiting an optical rotation of —61° in ethanol and also infrared absorption maxima at about 5.73 and 7.96 microns.

*Example 10*

A mixture of 10 parts of 16α,17α-epoxypregn-5-ene-3β,20β-diol 3,20-diacetate, one part of p-toluenesulfonic acid monohydrate, and 76.9 parts of methylamine is heated with stirring at 130° under 700 pounds per square inch pressure for about 4 days. The reaction mixture is then cooled and diluted with about 80 parts of methanol, and that methanol solution is poured carefully into water, resulting in precipitation of the crude product, melting at about 214–244°. Recrystallization from methanol results in pure 16β-methylaminopregn-5-ene-3β,17α,20β-triol, melting at about 229–242°. It displays infrared absorption maxima, in a potassium bromide disc, at about 2.91, 3.00, and 3.11 microns and is characterized further by the following structural formula

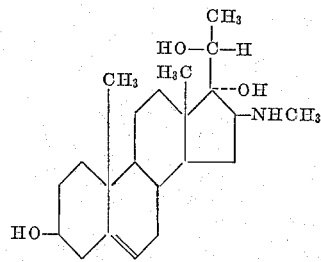

*Example 11*

To a solution of 15.6 parts of 16β-methylaminopregn-5-ene-3β,17α,20β-triol in 360 parts of tetrahydrofuran is added 10 parts by volume of 6 N hydrochloric acid. The resulting solution is cooled, and the crude hydrochloride is collected by filtration, then recrystallized from methanol-tetrahydrofuran to afford 16β-methylaminopregn-5-ene-3β,17α,20β-triol hydrochloride, melting at about 265–270° with decomposition. Infrared absorption maxima are observed, in a potassium bromide disc, at about 2.92, 2.97, 3.53, and 4.15 microns.

*Example 12*

A solution of 10 parts of 16α,17α-epoxypregn-5-ene-3β,20β-diol 3,20-diactate and one part of p-toluenesulfonic acid monohydrate in 76.3 parts of n-hexylamine is heated at the reflux temperature, in a nitrogen atmosphere, for about 8 days, at the end of which time 175 parts of ether is added, and the resulting solution is washed with water, dried over anhydrous sodium sulfate, and concentrated at reduced pressure to a thick syrup. That syrup is dissolved in ether, and the ether solution is stirred with excess 1 N hydrochloric acid to afford a white crystalline precipitate of the hydrochloride. The hydrochloride is collected by filtration, then stirred with a mixture of 100 parts by volume of saturated aqueous sodium bicarbonate and 140 parts of ether until the solid is completely dissolved. The layers are separated, and the organic layer is washed with water, then stripped of solvent under reduced pressure to afford a residue of the crude product which is crystallized twice from aqueous acetone to yield pure 16β-(n-hexylamino)pregn-5-ene - 3β,17α,20β - triol, melting at about 101.5–102.5°. It displays an optical rotation of —25.5° in chloroform and exhibits an infrared absorption peak at about 2.92 microns in a potassium bromide disc. This substance is characterized further by the following structural formula

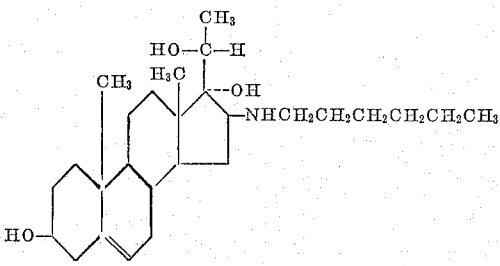

Example 13

A suspension of one part of 16β-methylaminopregn-5-ene-3β,17α,20β-triol, 5 parts of acetic anhydride, and 10 parts of pyridine is stirred at room temperature until homogeneous. After standing for about 18 hours, the solution is poured carefully into approximately 200 parts of water, and the precipitate which results is collected by filtration and dried to yield the crude product, melting at about 205–213°. Two recrystallizations from acetone-hexane afford pure 16β-(N-acetyl-N-methyl)aminopregn-5-ene-3β,17α,20β-triol 3,20-diacetate, melting at about 214–217°. It displays infrared absorption maxima, in chloroform, at about 2.76, 5.76, 6.10, and 7.98 microns and also an optical rotation, in chloroform, of −55°. This substance may be represented by the following structural formula

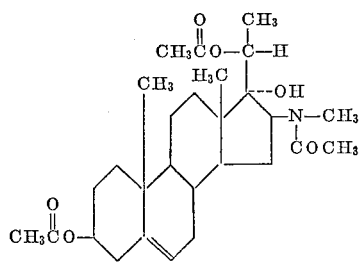

The substitution of an equivalent quantity of propionic anhydride in the procedure of this example results in 16β-(N - propionyl - N - methylaminopregn-5-ene-3β,17α,20β-triol 3,20-dipropionate.

Example 14

A mixture of 10 parts of 16α,17α-epoxypregn - 5 - ene-3β,20β-diol, 3,20-diacetate, one part of p-toluenesulfonic acid monohydrate, and 68.9 parts of ethylamine is stirred at about 182–196° and 750 pounds per square inch pressure for about 4 days, at the end of which time the mixture is cooled and diluted with methanol. Evaporation of the solvent by means of a stream of nitrogen affords a residue which is dissolved in ether, then stirred with approximately 100 parts by volume of 1 N hydrochloric acid. The aqueous layer is separated, diluted to approximately 1000 parts with water, then heated in order to dissolve the solid precipitate. That aqueous solution is made alkaline by the addition of 10% aqueous sodium hydroxide, and the resulting gelatinous mixture is extracted with ethyl acetate. The organic layer is separated, washed with water, and dried over anhydrous sodium sulfate, then stripped of solvent at reduced pressure. Recrystallization of the resulting residue several times, either from acetone or from acetone-hexane, affords pure 16β-ethylaminopregn-5-ene-3β,17α,20β-triol, melting at about 177.5–184.5°. It displays an infrared absorption peak at about 3.01 microns, in a potassium bromide disc. This compound is characterized further by the following structural formula

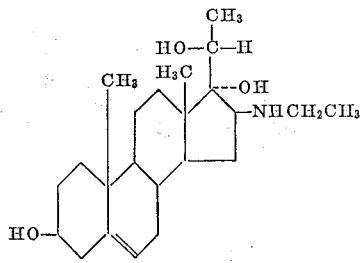

Example 15

A solution of 10 parts of 16α,17α-epoxypregn-5-ene-3β,20β-diol 3,20-diacetate and one part of p-toluenesulfonic acid monohydrate in 100 parts by volume of N-methylpiperazine is heated at the reflux temperature for about 18 days, then is cooled and poured into approximately 1000 parts of water. The resulting precipitate is collected by filtration, then recrystallized twice from acetone to yield pure 16β-(N-methylpiperazino)pregn-5-ene-3β,17α,20β-triol, melting at about 239–256°. It is characterized further by an optical rotation of −37° in chloroform and by an infrared absorption maximum at about 2.91 microns, in a potassium bromide disc. The structural formula of this substance is shown below:

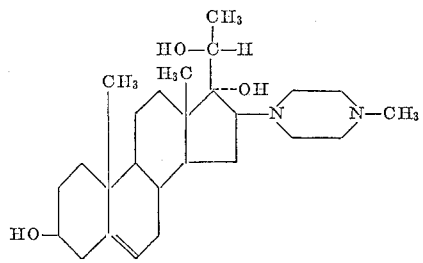

Example 16

A mixture of 10 parts of 16α,17α-epoxypregn-5-ene-3β,20β-diol 3,20-diacetate, one part of p-toluenesulfonic acid, 36.5 parts of triethylamine, and 41 parts of liquid ammonia is stirred at 146–149° under 1200 pounds per square inch pressure for about 86 hours. Evaporation of the solvents under reduced pressure affords a residue which is dissolved in a mixture of methanol and ether. Acidification of that mixture by the addition of isopropanolic hydrogen chloride results in precipitation of a cream-colored solid. This solid is collected by filtration, and is then dissolved in warm water. The addition of aqueous sodium bicarbonate to the latter aqueous solution results in separation of a gelatinous material which is collected by filtration through diatomaceous earth. The dried filter cake is extracted with hot methanol, and the organic extracts are evaporated to dryness to afford a residue which is crystallized three times from methanol, resulting in pure 16β-aminopregn-5-ene-3β,17β-triol, melting at about 243–265°. Infrared absorption maxima are observed, in a potassium bromide disc, at about 2.96, 3.03, and 3.14 microns. This compound can be represented also by the following structural formula

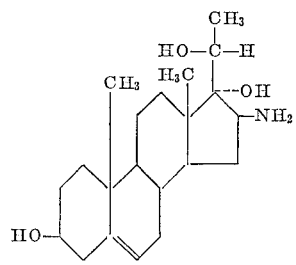

Example 17

A solution of 10 parts of 16α,17α-epoxypregn-5-ene-3β,20β-diol 3,20-diacetate and one part of p-toluenesulfonic acid in 102 parts of 2-hydroxyethylamine is heated at the reflux temperature for about 8 hours, at the end of which time the mixture is concentrated almost to dryness by distillation at reduced pressure. The residue is diluted with water, and the resulting precipitate is collected by filtration and dried. Dissolution of this solid material in hot methanol followed by acidification by means of isopropanolic hydrogen chloride and dilution with ether affords plate-like crystals of the crude product. Two recrystallizations from methanol affords pure 16β-(2-hydroxyethyl)aminopregn-5-ene-3β,17α,20β-triol hydrochloride, melting at about 271–276° with decomposition. It displays an infrared absorption maximum at about 3.02 microns, in a potassium bromide disc.

A mixture of 5.33 parts of 16β-(2-hydroxyethyl)-aminopregn-5-ene-3β,17α,20β-triol hydrochloride, 1500 parts of water and 5 parts by volume of 10% aqueous sodium hydroxide is heated at the reflux temperature with stirring for about one hour, after which time the mixture is cooled and the solid material is collected by filtration to afford the crude product, melting at about 192–199°. Successive recrystallizations from acetone-methanol afford pure 16β-(2-hydroxyethyl)aminopregn-5-ene-3β,17α,20β-triol hemimethanolate, melting at about 212–216°. It displays an infrared absorption maximum at 3.00 microns, in a potassium bromide disc, and is characterized further by the following structural formula

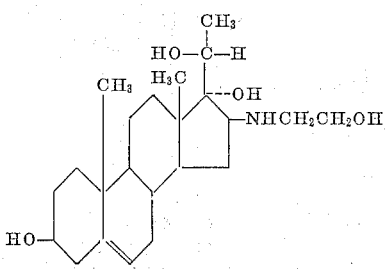

Example 18

A solution of 10 parts of 16α,17α-epoxypregn-5-ene-3β,20β-diol 3,20-diacetate, one part of p-toluenesulfonic acid monohydrate, and 100 parts of morpholine is heated at the reflux temperature for about 66 days, then is distilled almost to dryness at reduced pressure. The residue is diluted with approximately 200 parts of water, and the resulting precipitate is collected by filtration and dried, then dissolved in methanol. Acidification of that organic solution with isopropanolic hydrogen chloride followed by dilution with ether results in precipitation of the crude hydrochloride. Recrystallization from methanol-ether affords pure 16β-morpholinopregn-5-ene-3β,17α,20β-triol hydrochloride, melting at about 233–235° with decomposition. An infrared absorption maximum, in a potassium bromide disc, is observed at 2.98 microns.

To a solution of 5.43 parts of 16β-morpholinopregn-5-ene-3β,17α,20β-triol hydrochloride in 80 parts of methanol is added 6 parts by volume of 10% aqueous sodium hydroxide, and the resulting solution is poured carefully into approximately 500 parts of water. The resulting white precipitate is collected by filtration and dried to yield the crude amine, melting at about 125–145°. Successive recrystallizations from aqueous methanol affords 16β-morpholinopregn-5-ene-3β,17α,20β-triol, melting at about 140–147°. It displays infrared absorption maxima, in chloroform, at about 2.75 and 3.15 microns and is characterized further by the following structural formula

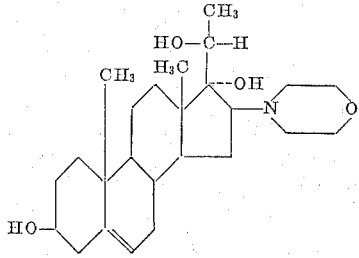

Example 19

A solution of 10 parts of 16α,17α-epoxypregn-5-ene-3β,20α-diol 3,20-diacetate and one part of p-toluenesulfonic acid monohydrate in 57.8 parts of methylamine is heated at about 130° under 700 pounds per square inch pressure for about 6 days. The reaction mixture is diluted first with methanol and then with water, resulting in precipitation of the crude product. Recrystallization of the latter material from aqueous methanol affords pure 16β - methylaminopregn - 5 - ene - 3β,17α,20α - triol, melting at about 218–225° and exhibiting infrared absorption maxima at about 2.90 and 3.04 microns. This substance is characterized further by the following structural formula

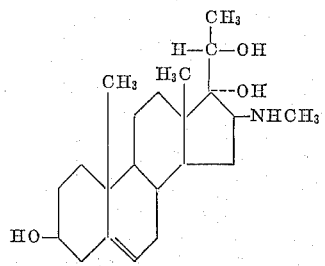

Example 20

To a solution of 31 parts of 16β-methylaminopregn-5-ene-3β,17α,20α-triol in 270 parts of tetrahydrofuran is added 2 parts by volume of an isopropanolic solution containing 5.1 parts of hydrogen chloride, and the resulting precipitate is collected by filtration, then dried to afford the crude hydrochloride, melting at about 299–302° with decomposition. Recrystallization from methanol-tetrahydrofuran affords pure 16β-methylaminopregn-5-ene-3β,17α,20α-triol hydrochloride, melting at about 307–308° with decomposition. It displays infrared absorption maxima, in a potassium bromide disc, at about 2.90, 3.02, 3.22, 3.62, 4.03, and 6.21 microns.

Example 21

A mixture of 10 parts of 16α,17α-epoxypregn-5-ene-3β,20β-diol 3,20-diacetate, one part of p-toluenesulfonic acid monohydrate, and 71.8 parts of n-propylamine is heated at about 150° under 200 pounds per square inch pressure for about 72 hours. The reaction mixture is then partially concentrated and poured carefully into approximately 500 parts of water. The initial oily product which separates solidifies on standing and is isolated by filtration. That crude product is then dissolved in ether, and the ether solution is stirred with excess 1 N hydrochloric acid for about one hour. The crude hydrochloride which forms is collected by filtration, then is recrystallized from methanol-ether to yield pure 16β-n-propylaminopregn-5-ene-3β,17α,20β-triol hydrochloride, melting at about 269–272° with decomposition and exhibiting an infrared absorption maximum, in a potassium bromide disc, at 2.98 microns.

A solution of 6.38 parts of 16β-n-propylaminopregn-5-ene-3β,17α,20β-triol hydrochloride in 80 parts of methanol is stirred with 10 parts by volume of 10% aqueous sodium hydroxide, then is diluted with approximately 500 parts of water. The resulting precipitate is collected by filtration to afford the crude amine, melting at about 166.5–168.5°. Recrystallization from aqueous methanol affords pure 16β-n-propylaminopregn-5-ene-3β,17α,20β-triol, melting at about 169.5–173.5° and displaying an infrared absorption maximum in chloroform, at 2.73 microns. This substance can be characterized further by the following structural formula

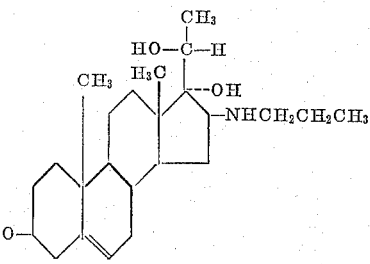

Example 22

A solution of 10 parts of 16α,17α-epoxypregn-5-ene-3β,17α,20β-triol, 3,20-diacetate and one part of p-toluenesulfonic acid monohydrate in 90 parts of ethylene diamine is heated at the reflux temperature for about 104 days, then is cooled and poured cautiously into approximately 1000 parts of water. The resulting precipitate is collected by filtration and dried to afford the crude product, melting at about 136–147°. That substance is dissolved in 80 parts of methanol, and the organic solution is acidified by means of excess isopropanolic hydrogen chloride. Dilution of that acidic mixture with anhydrous ether results in precipitation of the crude dihydrochloride, melting at about 273–275° with decomposition. Dissolution of that substance in aqueous ethanolic hydrogen chloride, consisting of 350 parts of water, 80 parts of ethanol, and 2.4 parts of concentrated hydrochloric acid, followed by decolorization with activated carbon and dilution with 100 parts by volume of saturated aqueous sodium bicarbonate results in precipitation of the crude amine, which is collected by filtration and recrystallized twice from methanol to yield pure 16β-(2-aminoethyl)aminopregn-5-ene-3β,17α,20β-triol, melting at about 183.5–195.5°. It is characterized further by infrared absorption maxima, in chloroform, at 2.70 and 2.76 microns and also by the following structural formula

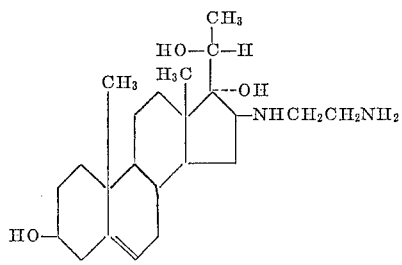

The substitution of an equivalent quantity of trimethylenediamine in the procedure of this example results in 16β-(3-aminopropyl)aminopregn-5-ene-3β,17α,20β-triol.

*Example 23*

A mixture of 10 parts of 16α,17α-epoxypregn-5-ene-3β,20β-diol 3,20-diacetate, one part of p-toluenesulfonic acid monohydrate, and 86 parts of piperidine is heated at about 150° under 90 pounds per square inch pressure for about 7 days, then is concentrated almost to dryness under reduced pressure. The resulting residue is dissolved in 350 parts of ether, and 100 parts by volume of 1 N hydrochloric acid is added. The aqueous suspension is separated, then made alkaline by the addition of 10% aqueous sodium hydroxide, and the resulting precipitated amine is collected by filtration, then purified by successive recrystallizations from acetone, thus producing pure 16β-piperidinopregn-5-ene-3β,17α,20β-triol, melting at about 212–221°. An infrared absorption peak is observed, in chloroform, at 2.76 microns. A structural representation of this compound is shown below:

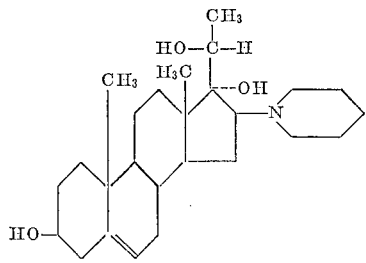

*Example 24*

A mixture of 1.04 parts of 16β-dimethylaminopregn-5-ene-3β,17α,20β-triol, 11.4 parts of methyl iodide, and 24.2 parts of nitrobenzene is heated at the reflux temperature for about 3 hours, then is cooled to 0–5°, and the precipitate which forms is collected by filtration and dried to yield the crude product, melting at about 229–233° with decomposition. Recrystallization from methanol-ethyl acetate affords pure 16β-trimethylammoniumpregn-5-ene-3β,17α,20β-triol iodide, melting at about 229–234° with decomposition. It displays an infrared absorption peak at about 2.93 microns, in a potassium bromide disc, and is characterized further by the following structural formula

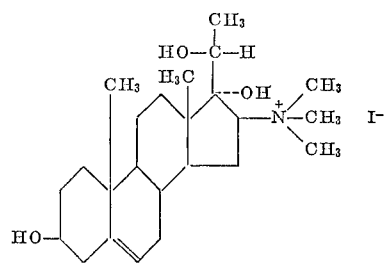

*Example 25*

A mixture of 5 parts of 16α,17α-epoxy-6-methylpregn-5-ene-3β,20β-diol, one part of p-toluenesulfonic acid monohydrate, and 38.5 parts of methylamine is stirred at 132° under 700 pounds per square inch pressure for about 5 days. The mixture is cooled and diluted, first with a small amount of methanol then with water, and the resulting precipitate is collected by filtration to afford the crude product, melting at about 226–242° with decomposition. Purification of that crude product by two crystallizations from methanol affords pure 6-methyl-16β-methylaminopregn-5-ene-3β,17α,20β-triol, melting at about 234–252°. It displays infrared absorption maxima at about 2.99 and 3.07 microns in a potassium bromide disc and is further characterized by the following structural formula

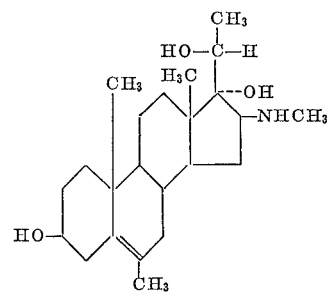

*Example 26*

To a solution of 5 parts of 16β-methylaminopregn-5-ene-3β,17α,20β-triol in 400 parts of methanol is added 228 parts of methyl iodide and 10 parts of sodium bicarbonate, and the resulting reaction mixture is heated at the reflux temperature for about 6 hours. The mixture is cooled, concentrated to a small volume at reduced pressure and diluted with water, thus resulting in precipitation of the crude product, melting at 126–171.5°. That material is collected by filtration, then recrystallized several times from aqueous methanol to produce pure 16β-dimethylaminopregn-5-ene-3β,17α,20β-triol, melting at about 161.5–176.5° and exhibiting an infrared absorption maximum at 2.74 microns in chloroform. This substance can be represented by the following structural formula

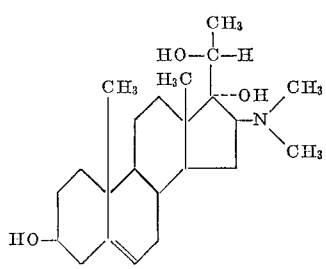

Example 27

To a stirred mixture of 1.5 parts of lithium aluminum hydride with 180 parts of tetrahydrofuran is added 5 parts of 16β-(N-acetyl-N-methyl)aminopregn-5-ene-3β,17α,20β-triol 3,20-diacetate, and the resulting reaction mixture is heated at the reflux temperature for about 72 hours. To the cooled mixture is then added successively 270 parts of ethyl acetate and 100 parts by volume of saturated aqueous sodium potassium tartrate. The layers are separated, and the aqueoues layer is extracted with ethyl acetate. The combined ethyl acetate layers are dried over anhydrous sodium sulfate, then stripped of solvent under reduced pressure. Two recrystallizations from ether of the resulting residue affords pure 16β-(N-ethyl-N-methyl) aminopregn-5-ene-3β,17α,20β-triol, melting at about 192–205°. An infrared absorption peak is observed at 2.75 microns in chloroform, and this compound is characterized further by the following structural formula

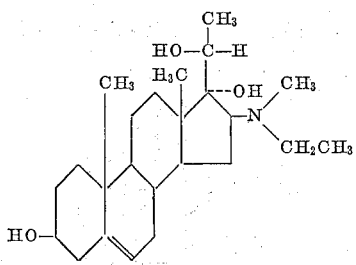

Example 28

To a stirred mixture of 1.27 parts of 16β-methylaminopregn-5-ene-3β,17α,20β-triol and 50.8 parts of acetone is added 2.2 parts of 70% aqueous perchloric acid, and that reaction mixture is kept at room temperature for about 5 hours, then is poured into excess aqueous sodium bicarbonate mixed with ice. That mixture is then extracted with benzene, and the benzene layer is separated, washed with water, dried over anhydrous sodium sulfate, and stripped of solvent under reduced pressure to afford a crystalline residue of the crude acetonide. Recrystallization from benzene-hexane affords needle-like crystals of 16β-methylaminopregn-5-ene-3β,17α,20β-triol 17,20-acetonide, melting at about 194–205.5°. A pure sample, melting at about 195.5–205.5° is obtained by two additional recrystallizations from benzene-hexane. This substance is characterized further by an optical rotation of —45.5° in chloroform and by an infrared absorption peak at 3.10 microns in a potassium bromide disc, and also, by the following structural formula

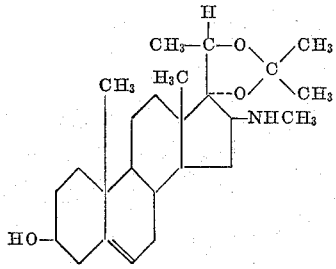

Example 29

To a mixture of 6.42 parts of 16β-methylaminopregn-5-ene-3β,17α,20β-triol 17,20-acetonide with 60 parts of pyridine is added 30 parts of acetic anhydride, and the resulting reaction mixture is kept at room temperature for about 16 hours. At the end of that time the mixture is cooled to 0–5° and is diluted gradually with approximately 250 parts of water. The white crystalline precipitate which separates is collected by filtration and dried to afford the crude product, melting at about 200–208°. Two successive recrystallizations from acetone affords pure 3β-acetoxy-16β-(N-acetyl-N-methyl)amino-pregn-5-ene-17α,20β-diol 17,20-acetonide, melting at about 208.5–214.5°. It displays an optical rotation of —50° in chloroform, infrared absorption maximum at about 5.78, 6.07, 7.96, and 9.70 microns in chloroform, and is characterized further by the following structural formula

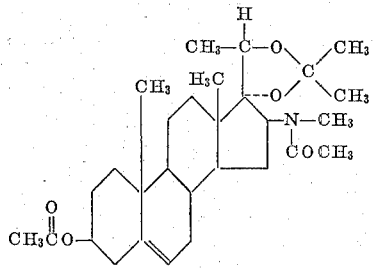

Example 30

To a solution of 5 parts of 16β-methylaminopregn-5-ene-3β,17α,20β-triol in 200 parts of ethanol containing a slight excess of hydrogen chloride is added 0.5 part of platinum oxide catalyst, and that mixture is shaken in a hydrogen atmosphere at room temperature and 45–60 pounds per square inch pressure. After one molecular equivalent of hydrogen has been absorbed, the catalyst is removed by filtration, and the filtrate is partially concentrated, then is diluted with water. The addition of aqueous sodium bicarbonate to that solution results in formation of a precipitate, which is collected by filtration to afford the crude product, melting at about 230–244°. Successive recrystallizations from methanol afford pure 16β-methylamino-5α-pregnane-3β,17α,20β-triol, melting at about 236–252° and exhibiting infrared absorption maxima at about 2.92, 2.99, and 3.10 microns. This compound is represented by the following structural formula

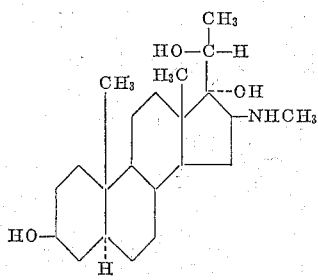

Example 31

A mixture of 5 parts of 16α,17α-epoxypregn-5-ene-3β,20β,21-triol 3,20,21-triacetate, 0.5 part of p-toluenesulfonic acid monohydrate, and 38.5 parts of methylamine is stirred at 130–135° under 575 pounds per square inch pressure for about 4 days. The addition of 80 parts of methanol followed by 250 parts of water results in precipitation of the crude product, which is collected by filtration then recrystallized first from aqueous methanol then from methanol-acetone to afford pure 16β-methylaminopregn-5-ene-3β,17α,20β-tetrol, melting at about 228–240° with decomposition. An infrared absorption maximum is observed at about 2.91 microns, in a potassium bromide disc. This compound is represented by the following structural formula

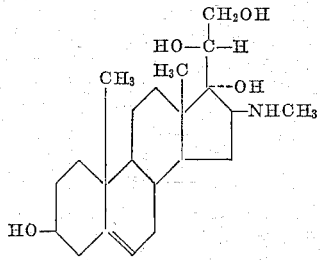

Example 32

By substituting an equivalent quantity of 3-hydroxypropylamine and otherwise proceeding according to the processes described in Example 17, 16β-(3-hydroxypropyl)-aminopregn-5-ene-3β,17α,20β-triol is obtained.

Example 33

The substitution of equivalent quantities of 16β-ethylaminopregn-5-ene-3β,17α,20β-triol and ethyl iodide in the procedure of Example 26 results in 16β-diethylaminopregn-5-ene-3β,17α,20β-triol.

Example 34

The substitution of an equivalent quantity of 16α,17α-epoxy-3β-hydroxy-5β-pregnan-20-one in the procedure of Example 4 results in 16α,17α-epoxy-5β-pregnane-3β,20β-diol and 16α,17α-epoxy-5-β-pregnane-3β,20α-diol.

Example 35

By substituting an equivalent quantity of 16α,17α-epoxy-5β-pregnane-3β,20β-diol and otherwise proceeding according to the processes described in Example 10, 16β-methylamino-5β-pregnane-3β,17α,20β-triol is produced.

Example 36

The substitution of an equivalent quantity of pyrrolidine in the procedure of Example 23 results in 16β-pyrrolidinopregn-5-ene-3β,17α,20β-triol.

What is claimed is:
1. A member selected from the group consisting of compounds of the formulas

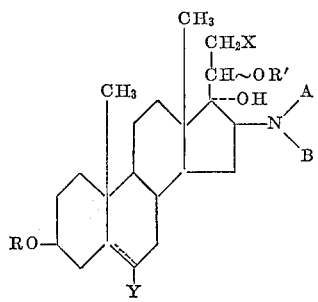

and

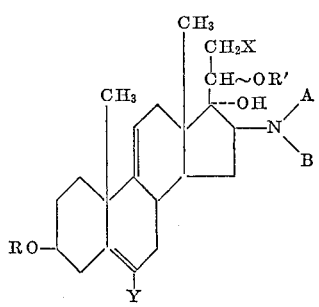

and the 17,20-acetonides thereof, wherein R and R' are selected from the group consisting of hydrogen and lower alkanoyl radicals, X is a member of the class consisting of hydrogen, hydroxy, and (lower alkanoyl)oxy radicals, A is selected from the group consisting of hydrogen, lower alkyl, hydroxy(lower alkyl), and amino(lower alkyl) radicals, B is selected from the group consisting of hydrogen, lower alkyl, and lower alkanoyl radicals, A and B together with the nitrogen atom comprise a radical selected from the group consisting of morpholino, N-methylpiperazino, and

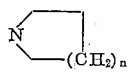

wherein $n$ is a positive integer less than 4, Y is a member of the class consisting of hydrogen and the methyl radical, and the dotted line indicates the optional presence of a 5(6) double bond.

2. 16β-(N-acetyl-N-methylamino)pregn-5-ene-3β,17α,20β-triol 3,20-diacetate.
3. 16β-N-methylpiperazinopregn-5-ene-3β,17α,20β-triol.
4. 16β-aminopregn-5-ene-3β,17α,20β-triol.
5. 16β-(2-hydroxyethyl)aminopregn-5-ene-3β,17α,20β-triol.
6. 16β-morpholinopregn-5-ene-3β,17α,20β-triol.
7. 16β-(2-aminoethyl)aminopregn-5-ene-3β,17α,20β-triol.
8. 16β-trimethylammoniumpregn-5-ene-3β,17α,20β-triol iodide.
9. 6-methyl-16β-methylaminopregn-5-ene-3β,17α,20β-triol.
10. 16β-methylaminopregn-5-ene-3β,17α,20β-triol 17,20-acetonide.
11. 16β-methylamino-5α-pregnane-3β,17α,20β-triol.
12. 16β-methylaminopregn-5-ene-3β,17α,20β,21-tetrol.
13. A compound of the formula

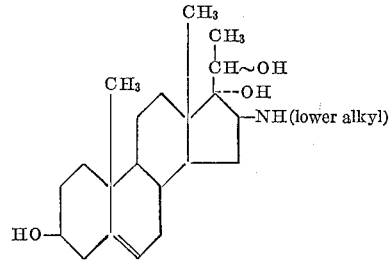

14. 16β-methylaminopregn-5-ene-3β,17α,20β-triol.
15. A compound of the formula

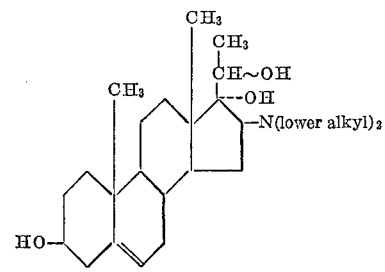

16. 16β-dimethylaminopregn-5-ene-3β,17α,20β-triol.
17. A compound of the formula

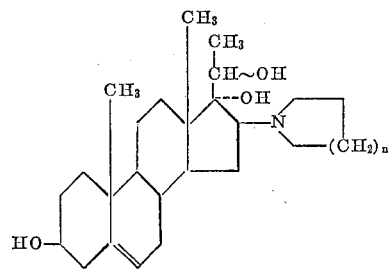

wherein $n$ is a positive integer less than 4.
18. 16β-piperidinopregn-5-ene-3β,17α,20β-triol.
19. 16β,17α-epoxypregn-5-ene-3β,20α,21-triol 3,20,21-triacetate.
20. 16α,17α-epoxypregn-5-ene-3β-20β,21-triol 3,20,21-triacetate.

No references cited.

LEWIS GOTTS, *Primary Examiner.*

UNITED STATES PATENT OFFICE
CERTIFICATE OF CORRECTION

Patent No. 3,232,930                                    February 1, 1966

Clarence G. Bergstrom

It is hereby certified that error appears in the above numbered patent requiring correction and that the said Letters Patent should read as corrected below.

Column 5, line 4, for "5,9(11-" read -- 5,9(11)- --; column 7, line 31, for "N-methylaminopregn-" read -- N-methyl)aminopregn- --; column 8, line 39, for "3β,17β-" read -- 3β,17α,20β- --; line 73, for "(2-hydroxyethyl)-" read -- (2-hydroxyethyl) --; column 14, line 60, for "3β,17α,20β-" read -- 3β,17α,20β,21- --; column 15, line 18, for "5-β-" read -- 5β- --; column 16, line 68, for "16β,17α-" read -- 16α,17α- --; line 70, for "3β-20β,21-" read -- 3β,20β,21- --.

Signed and sealed this 27th day of December 1966.

(SEAL)
Attest:

ERNEST W. SWIDER                                      EDWARD J. BRENNER
Attesting Officer                                            Commissioner of Patents